United States Patent [19]

Hofmann

[11] 3,714,848

[45] Feb. 6, 1973

[54] STEP-BY-STEP TRANSMISSION

[76] Inventor: Detlef Hofmann, 7531 Kieselbronn, Germany

[22] Filed: Dec. 21, 1970

[21] Appl. No.: 100,139

[30] Foreign Application Priority Data

Dec. 22, 1969 Germany....................P 19 64 263.8

[52] U.S. Cl. ........................74/822, 74/117, 74/118, 74/125.5, 74/827

[51] Int. Cl. ..............................................B23b 29/32

[58] Field of Search.74/827, 822, 815, 813 L, 813 R, 74/826, 125.5, 119, 118, 117, 116

[56] References Cited

UNITED STATES PATENTS

| | | | |
|---|---|---|---|
| 2,784,612 | 3/1957 | Liska | 74/827 X |
| 3,482,473 | 12/1969 | Seybold | 74/827 X |

*Primary Examiner*—Milton Kaufman
*Assistant Examiner*—F. D. Shoemaker
*Attorney*—Walter Becker

[57] ABSTRACT

A step-by-step transmission, or indexing mechanism, or dividing head, in which a part is provided which is adapted to be indexed, for instance in rotation. For indexing the part, a crank shaft is provided adapted for being driven in rotation and having a crank pin thereon which is adjustable in the radial direction of the crank shaft. As the shaft and crank pin rotate, a first member is driven in reciprocation and oscillation by the crank pin while a second member is driven in oscillation. The second member carries a follower which engages the part to be indexed in one direction of oscillation of the second member, the said engaging being under the control of the first member, while in the other direction of oscillation of the second member, a locking arrangement locks the part against movement.

13 Claims, 9 Drawing Figures

PATENTED FEB 6 1973

Inventor:

Detlef Hofmann

By [signature]

Inventor:
Detlef Hofmann
By [signature]

Inventor:
Detlef Hofmann
By

STEP-BY-STEP TRANSMISSION

The present invention concerns a step-by-step transmission which is adapted to be arrested and for purposes of stepwise advancing structural elements to be moved along a straight line or along a circular line, to positively transform a continuous or limited rotary movement into a stepwise movement with definitely fixed stopping points.

A heretofore known step-by-step transmission of the above mentioned type utilizes a Geneva cross for transforming the rotary movement into a stepwise movement. This known transmission, in addition to defining a precise step length, also has the advantage that the shifting movement is accelerated up to a maximum speed and is then correspondingly retarded. In this way, this transmission very much approaches the ideal sine-shaped course of movement while the acceleration and retardation follows an approximate cosine curve. The drawback of this known transmission consists in that the step length controlled by this transmission is not adjustable. Merely coarse changes can be effected by exchanging the Geneva cross. Also the range of tolerance between minimum and maximum step length, even when exchanging the Geneva cross is rather limited in view of the construction of this known transmission.

Ideal acceleration and retardation values may be derived from plane or spherical crank slides. This type of transmission, however, is rather seldom utilized because the expenses are considerably higher than for a Geneva cross transmission, and the construction likewise does not permit an adjustment.

As positive transmission there has also become known a cam drive control mechanism which primarily comprises a worm drive and in which the worm at the stopping points has the pitch 0. Also this transmission is hardly used because it lacks an adjustability while the course of movements is less satisfactory.

As non-positively working transmissions of this type, there may be mentioned pawl ratchet transmissions and similar transmissions, the pneumatic or hydraulic cylinders being arranged in pairs.

The ideal sine-shaped course of movement from stopping point to stopping point not only greatly saves the transmission elements and the structural element to be moved but also permits minimum step periods. This is very important when employing such transmissions because the step-by-step times are generally dead or lost times. Aside from pure automats or specially designed machines, with such step-by-step transmissions it is extremely advantageous in addition to be able to vary the sine-shaped step velocity course, also to be able to vary the length of the step, at least for preferred adjustments. Most desirable would be an adjustability or control for very small steps and, of course, an infinite precise variability of the length of the step. As pre-condition for such control transmissions, it is necessary that they can be arrested at the stopping points because in this position the structural elements are subjected to operations or operations have to be carried out by means of such structural elements which require a non-yieldable fixing of the structural elements. In addition thereto, there may be mentioned, of course, the requirement that the transmission must be economical, must not be easily liable to disorders, will require only slight servicing and must be relatively inexpensive.

These and other objects and advantages of the invention will appear more clearly from the following specification in connection with the accompanying drawings, in which:

FIG. 1A is a fragmentary sectional view in elevation from the left side of the apparatus of FIG. 1 and illustrating the detailed relationship of the parts with the slide member and crankpin in the top position.

FIG. 1B is a fragmentary top plan view partially sectioned to show the detailed relationship of the parts after rotation of the crankpin 90° counterclockwise from the position shown in FIG. 1A.

Figure 1:
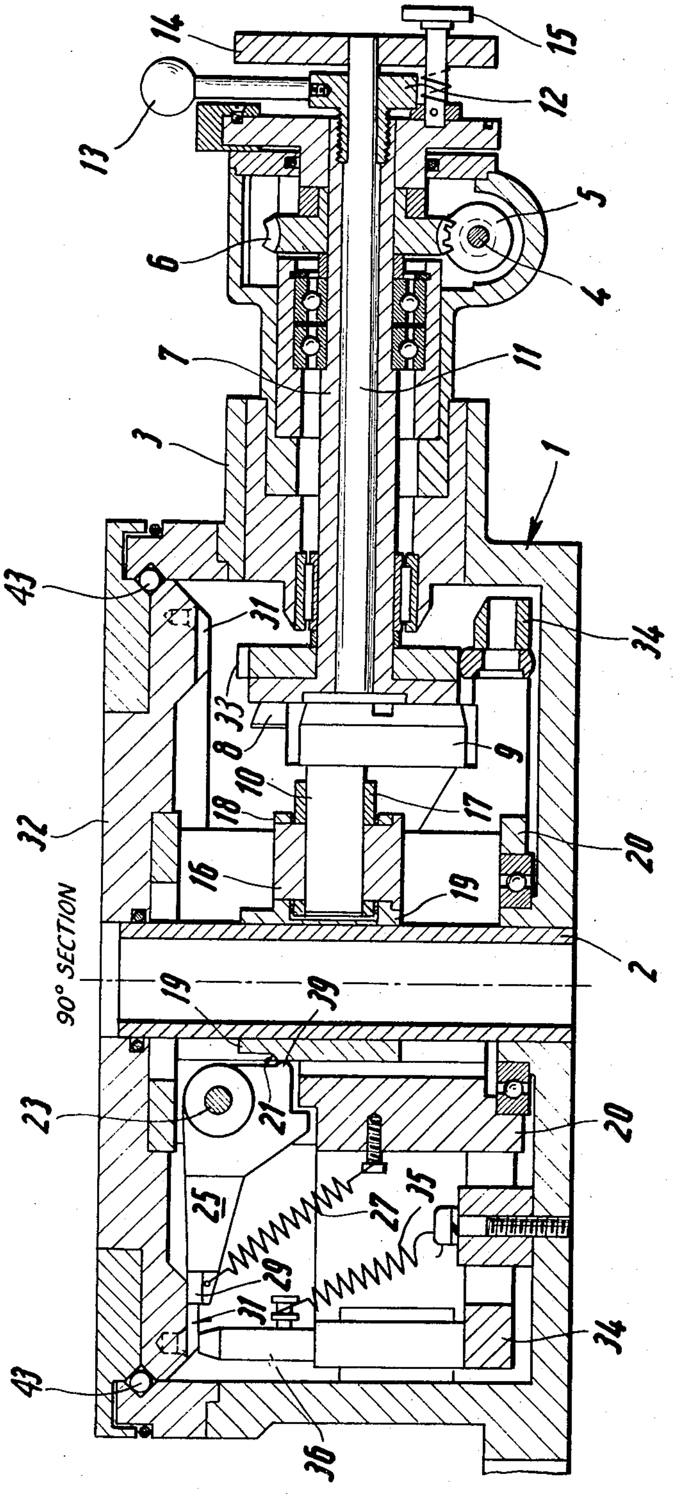
FIG. 1 is a 90° section through an apparatus according to the invention.

Starting from an arrestable step-by-step transmission which, for purposes of stepwise advancing structural elements to be moved rectilinearly or along a circular path, transforms a continuous or limited rotary movement positively into a stepwise movement with definitely fixed stopping points, the above objects have been realized according to the present invention. The crank pin of a crank having a variable crank length is adapted to be driven at a uniform rotary movement and engages a sliding member is displaceably mounted on a stationary pin. The sliding member has arranged thereon at least one camming means which is adapted to be displaced parallel to the pin and to actuate a follower which in turn engages the structural element to be moved. The condition as to a sine-shaped course of movement of the step-by-step transmission is fully met with this transmission inasmuch as the circular movement of the crank pin is converted into a corresponding movement of the structural element while the sliding member carries out a component of movement which is perpendicular thereto. Moreover, with this arrangement, the stopping point is completely non-critical since for this purpose the entire return arc of the crank pin is available. Moreover, the acceleration as well as the retardation of the structural element is completely shock-free so that the wear of the various elements will be at a minimum. Furthermore, with this transmission, it is possible without difficulties to adapt the length of the respective step to the respective requirements by correspondingly changing the length of the crank arm. In contrast to heretofore known transmissions, no limit in downward directions is encountered inasmuch as the control may start at 0 and continue to a maximum value which is located at 180 angle degrees of the crank.

It is, of course, to be understood that also the starting point of the crank pin on the sliding member may be differently spaced from the stationary pin. Furthermore, the two possibilities, namely variation in the length of the crank arm and variation in the distance between the pivot point of the sliding member and the starting point of the crank pin may be combined with each other.

Inasmuch as the structural member will, by the control transmission, be returned from the speed 0 through a maximum speed to the speed 0, also the arresting of the structural element can be effected in a very simple manner. The retardation of the masses of the structural elements may cause difficulty and with heretofore known control transmissions of the type involved may prevent the engagement of the arresting means. This retardation of the masses of the structural elements is in this instance effected by the control transmission down to the speed 0. Thus, the arresting means may engage the stationary structural element and may block the same. In this way, there exists the possibility for a precise adjustment slightly to displace the structural element to be braked to 0; such displacement may be effected by any standard means with or against the advancing device.

Furthermore, this transmission may be produced so strong and in such a simple manner that it will also meet the requirements as to be free to a maximum extent from disorders and from being serviced.

Expediently, the crank arm is displaceably arranged at the end face of the crank shaft perpendicularly with regard to the shaft. The crank arm is adjusted and arrested by a control spindle extending centrally through the crank shaft. With this embodiment, an engagement of the control transmission for adjusting the crank arm by withdrawing the control spindle will be avoided which in turn greatly simplifies the servicing of the control transmission. For preferred crank arm length or adjustments for the step positions, arresting means may be provided which further simplify the adjustment of this transmission.

The assembly as well as the production of the control transmission according to the present invention is greatly simplified. Simplification exists due to the fact that the engagement mounting crank pin-sliding member includes a sleeve rotatable in a fork of the sliding member into the plane of the crank pin and includes a bolt extending through the fork with the sleeve and extending around the crank pin. This design not only saves an expensive journalling for the crank pin but also permits a simple plug assembly. If the sliding member is displaceably guided in the direction of the pin in a cage which is coaxially rotatable with regard to the stationary pivot and if at least one of the followers is mounted on the cage, then the up and downward movement of the sliding member is no longer absorbed by the followers inasmuch as this movement will be effected within the cage.

The follower or entraining means may be formed by a follower pin adapted to be pressed in against the thrust of a spring in a direction parallel to the pivot or the follower may be formed by a follower finger which is pivotable against the thrust of the spring. If the follower finger is mounted on the cage, an optimum engagement of the engaging follower finger with the structural element will be obtained due to the fact that the follower finger is provided with a cam slidable on the sliding member, said sliding member having the cam sliding surface at the area corresponding to the crank position $r/2$ or $3(r/2)$ equipped with a slope. When the cam has moved onto the slope, it depresses the follower finger in the direction of the structural element and thus moves the follower finger into engagement with the structural element. If, however, the cam is located below the slope, the follower finger will be in disengagement and thus can be returned to its starting position. This shock-like engagement with the structural element or the fast removal of the follower finger from the structural element permits the wide pivoting range of the control transmission according to the invention. This amounts to approximately 180 angle degrees, inasmuch as the engaging fingers are each time shortly prior to reaching the extreme position brought into connection with the structural element or out of connection therewith. This operation may be aided by making the distance between the follower finger axis and the cam less than that from said axis to the engaging part of the follower finger because in such an instance the jerk-like short movement of the cam is correspondingly quickly conveyed to the engaging member proper at the required stroke length.

Expediently, the engaging element of the follower and/or the counter element in the structural element to be moved are wedge-shaped. Thereby not only the engagement of the follower may be facilitated but also slight adjusting errors will be compensated for during the engagement by the displacement of the structural element until the engaging element fully engages the structural element.

If in conformity with a further development of the invention, the follower is formed by a section of a friction clutch, and if the other section of the clutch is arranged on the structural element to be moved, the structural element may be moved by the control transmission with an infinitely variable step length. This movement can generally not be carried out so precisely as is the case with a follower engaging the structural member, but in many instances the precision obtainable by such coupling will suffice. The coupling or clutch may be formed by a flat or conical clutch. The two clutch sections may be pressed against each other in the manner as described in connection with the follower. In order also with this type of transmitting of the movement to arrive at as precise results as possible, it is suggested to synchronize the structural element at least in its 0 position, in other words, synchronized with regard to the rated step length. This synchronization may also be effected at the extreme position of the control transmission for instance at each whole angle degree. In this way, errors unavoidable in view of the type of the transfer of the movement will be prevented from adding up via a plurality of rotations of the control transmission.

Advantageously, a cam is provided between the crank positions $3(r/2) - 0 - r/2$ on the crank shaft for arresting the structural element through a linkage system. The arresting itself may be carried out in any standard manner for instance by means of conical pins engaging the structural element. A very precise arresting is obtained by a plurality of balls which are adapted to be moved into wedge-shaped superimposed grooves in the housing and in the structural element, said balls being movable into said grooves by cam means mounted on the crank shaft. The balls not only reliably arrest the structural element in the housing, but also compensate for minor errors in the location of the structural element. Particularly when utilizing a clutch between the sliding member and the structural element to be moved, it is suggested to carry out the arresting by means of a brake band which extends around the structural element or an element connected thereto. This brake band may also be tightened in a manner known per se by electromagnetic forces in which instance the electromagnet may be made effective by the cam on said crank shaft.

Referring now to the drawings in detail, the arrangement shown therein comprises a cylindrical housing 1 in its central portion having a stud or pivot 2 connected thereto. Mounted on housing 1 there is a cylindrical guiding element 3 for passing a shaft therethrough. Flanged perpendicularly to said cylindrical guiding element 3 is an electric motor. The motor includes shaft 4 which has mounted thereon a worm 5 meshing with a corresponding worm wheel 6. The worm wheel 6 is connected to a hollow shaft, namely the crank shaft 7 which is journalled in the cylindrical guiding member 3 and at its transmission side ends in a transverse dovetail 8. Mounted on the dovetail 8 is a crank arm 9 having a crank pin 10 connected thereto. Crank arm 9 is adapted by means of a control spindle 11 to be displaced on the dovetail 8 through a cam groove and eccentric pin arrangement and to be arrested by means of an arresting sleeve 12 with handle 13. The control spindle 11 is furthermore, outside the cylindrical guiding member 3, connected to a control plate 14 which is adapted to be arrested at a desired angle position by means of an arresting pin 15. This angular position determines a certain crank arm length of the crank arm 9 and thus a more or less great diameter of the circle described by the crank pin 10.

Figure 4:
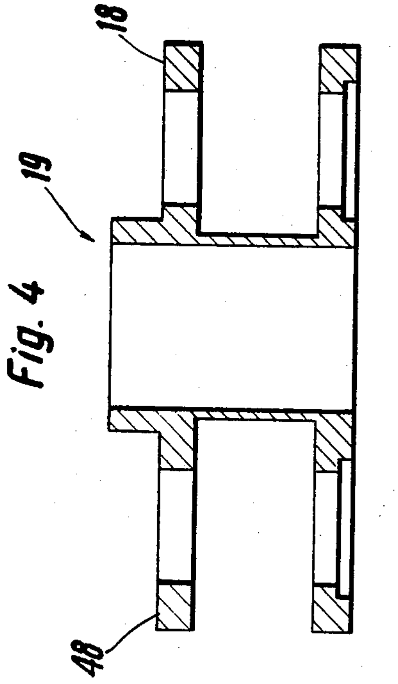
FIG. 4 is a section through the sliding member.
Figure 5:
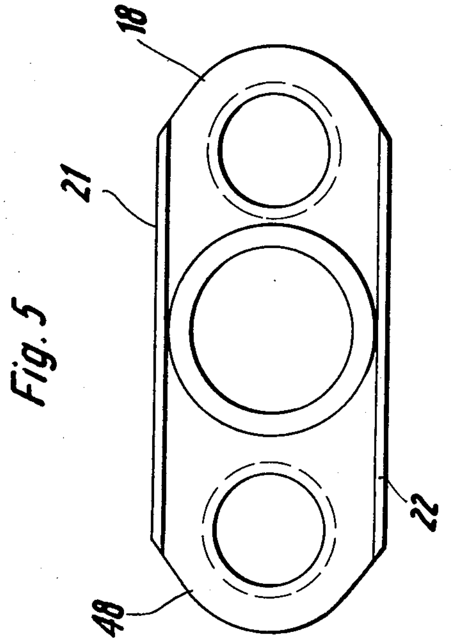
FIG. 5 is a top view of FIG. 4.
Figure 6:
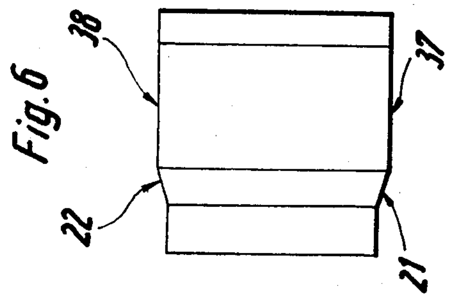
FIG. 6 is an side view from the right relative to FIG. 5.
Figure 2:
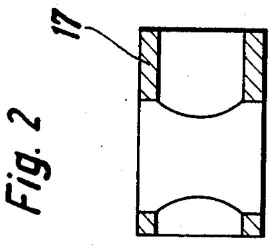
FIGS. 2 and 3 illustrate details of the crank pin-sliding member connection.
Figure 3:
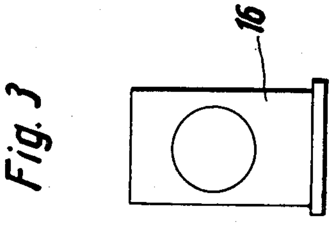
Figure 7:
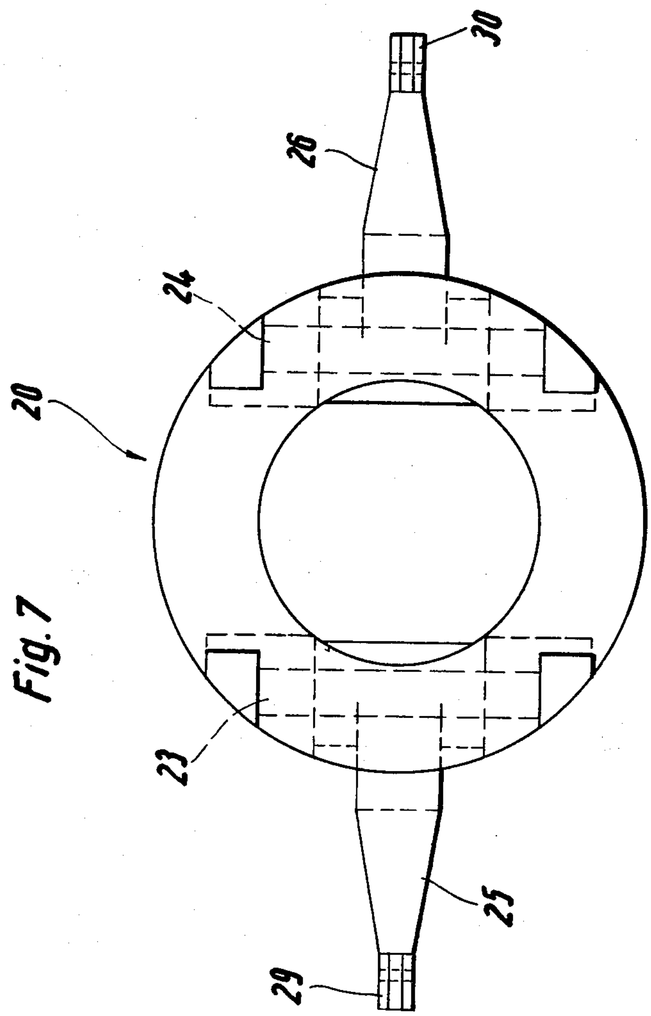
FIG. 7 is a top view of the cage containing the sliding member and the follower.

The crank pin 10 engages the bore of a bolt 16 which extends through a sleeve 17 and a fork 18 of a sliding member 19 (see also FIGS. 2–6). Mounted on the sliding member 19 is a further fork 48 with the bore of bolt 16 at a greater distance from the pivot axis of the sliding member. This fork is mounted when the step length is to be changed by a different starting point of the crank pin 10. The sliding member 19 slides on the stationary stud 2 and is guided by a cage 20 which is coaxially rotatably journalled with regard to the stationary stud 2. Slopes 21, 22 are provided peripherally on the side of the sliding member 19 operationally around the intermediate location of the sliding member 19. In the cage 20 and on pins 23, 24 arranged transverse to the stationary stud 2 there are pivotally mounted followers or entraining means 25, 26 which are pivotable against the thrust of springs 27, 28. The follower fingers 29, 30 of said followers 25, 26 engage corresponding recesses 31 of a structural member 32 to be moved, for instance a clamping table. The structural member 32 is rotatably journalled at 43 on housing 1.

Connected to the crank shaft 7 is a cam 30 which in the lower position of crank 9, 10 presses upon a yoke 34 which in its turn against the thrust of spring 35 displaces conical pins 36 into corresponding recesses of the structural element 32 to be moved.

For purposes of operating the dividing apparatus, the desired step length (division or pitch) is adjusted by means of the control spindle 11 and is arrested by the arresting pin 15 extending through the control plate 14. The turning of the adjusting spindle brings about a corresponding displacement of the crank arm 9 on the dovetail 8 and thus brings about the adjustment of the crank pin 10 for a circle with a corresponding diameter. In response to a rotary movement of the shaft 4 of the electric motor, the crank shaft 7 is turned in conformity with the transmission between the worm drive 5, 6 whereby the crank pin 10 carries out a circular movement. This circular movement is transferred to the sliding member 19 which as a result thereof carries out an upward and downward movement on the stationary or stud pivot 2 and also carries out a pivotal movement about stud or pivot 2. The pivotal movement of the sliding member 19 is transferred to the cage 20 and consequently also to the follower 25 journalled therein. In the illustrated position, the crank pin occupies its upper extreme position and thus moves the structural element 32 through the intervention of the sliding member 19, cage 20 and followers 25, 26 at a maximum speed. The follower fingers 29,30 are pressed by the side surfaces 37,38 of the sliding member 19, which press upon the follower cams 39, into corresponding recesses 31 of the structural member 32 to be moved. During the downward movement of the crank pin 10 and a corresponding downward movement of the sliding member 19, the cams 39 of the followers 25 move into the range of the slopes 21, 22 and consequently, inasmuch as the followers are pulled downwardly by springs 27, 28, disengage the structural member 32. At the same time, the cam 30 on crank shaft 7 presses against yoke 34 which displaces the conical pin 36 into the structural member 32 and arrests the same. With this arresting step, a fine adjustment is obtained in view of the fact that the cone presses against the corresponding bore wall in the part 32 to be moved.

Generally, following a complete rotation of the crank shaft 7, the electromotor is turned off and braked so that now corresponding machining operations can be carried out. It is, however, also possible to permit the electromotor to move over a plurality of steps and to stop the electromotor only after the structural member 32 has moved over a plurality of steps. The stopping of the electric motor may be effected in a manner known per se when the crank 9,10 occupies its 0 position.

It may also be mentioned that with the illustrated arresting operation, the structural element 32 to be moved need not be lifted and placed on corresponding teeth. Of course, also other possible arresting types which are compatible with the upward and downward movement of yoke 34 may be utilized.

It is, of course, to be understood that the present invention is, by no means, limited to the particular construction shown in the drawings but also comprises any modifications within the scope of the appended claims.

What is claimed is:

1. In an adjustable step by step transmission or indexing mechanism which is adapted to be moved for stepwise advancing along a path to positively transfer a continuous and limited rotary movement into a stepwise movement arrestable with definitely fixed stopping points; a frame, a shaft rotatable in said frame, a crank arm on one end of said shaft having a crank pin and adapted to be subject to a uniform rotary movement, a pivot member in said frame perpendicular to the axis of said crank arm, a first member on said pivot member operably engaged by said crank pin so as to be reciprocated and oscillated on said pivot member by said crank pin as said shaft rotates, a second member rotatable in said frame on the axis of said pivot member and engaged by said first member so as to be oscillated thereby as said first member is oscillated by said crank pin, a part guided on said frame and adapted to be indexed thereon, and a follower on said second member operatively engageable with the said part in one direction of oscillation of said second member in said frame, said second member being in the form of a cage in which said first member is slidable but not rotatable, said follower being pivotally mounted on said second member.

2. A step by step transmission according to claim 1 in which said shaft is hollow, said crank pin being adjustable on said shaft in the radial direction, and a control spindle extending through said hollow shaft and at one end being connected to said crank arm for effecting said radial adjustment of said crank pin.

3. A step by step transmission according to claim 2 which includes arresting means at the other end of said control spindle for arresting said control spindle in angularly adjusted positions relative to said shaft.

4. A step by step transmission according to claim 1 which includes means for adjusting the distance between the axis of said pivot member and the point of engagement of said crank pin with said first member.

5. A step by step transmission according to claim 1 which includes a fork on said first member on the side facing said crank pin, a pivot pin in said fork parallel with said pivot member and bored to receive said crank pin, and a sleeve on said crank pin having a transverse bore through which said pivot pin extends.

6. A step by step transmission according to claim 5 in which said first member includes a second fork on the side thereof opposite the first mentioned said fork adapted to alternatively support said pivot pin at a different radial distance from the axis of said pivot member than said first mentioned said fork.

7. A step by step transmission according to claim 1 in which said follower is spring biased in one direction.

8. A step by step transmission according to claim 1 in which said follower includes one end adjacent said part biased in a direction away from said part and another end adjacent said first member.

9. A step by step transmission according to claim 8 in which said other end of said follower comprises a cam nose engaging said first member and said first member has an incline which engages said cam nose in rotated positions of said crank pin corresponding to from $r/2$ to $3r/2$.

10. A step by step transmission according to claim 9 in which the pivot axis on which said follower is pivoted to said second member is closer to said cam nose than it is to said one end of said follower.

11. A step by step transmission according to claim 1 in which the portion of said follower engageable with said part is wedge shaped, and said part has teeth adapted to receive said portion of said follower therebetween.

12. A step by step transmission according to claim 1 in which lock means in the form of a pin reciprocably mounted in said frame is engageable to arrest said part.

13. A step by step transmission according to claim 1 which includes lock means interposed between said frame and said part and actuated by said shaft so as to operate alternately with movement of said part by said follower whereby said part is unlocked from said frame only during movement thereof by said follower.

* * * * *